Aug. 29, 1950   S. I. MacDUFF   2,520,731
TEMPERATURE COMPENSATED FORCE AND MOTION
TRANSMITTING HYDRAULIC SYSTEM
Filed Oct. 13, 1944   3 Sheets-Sheet 2

INVENTOR
STANLEY I. MacDUFF
BY Cecil F Arens
ATTORNEY

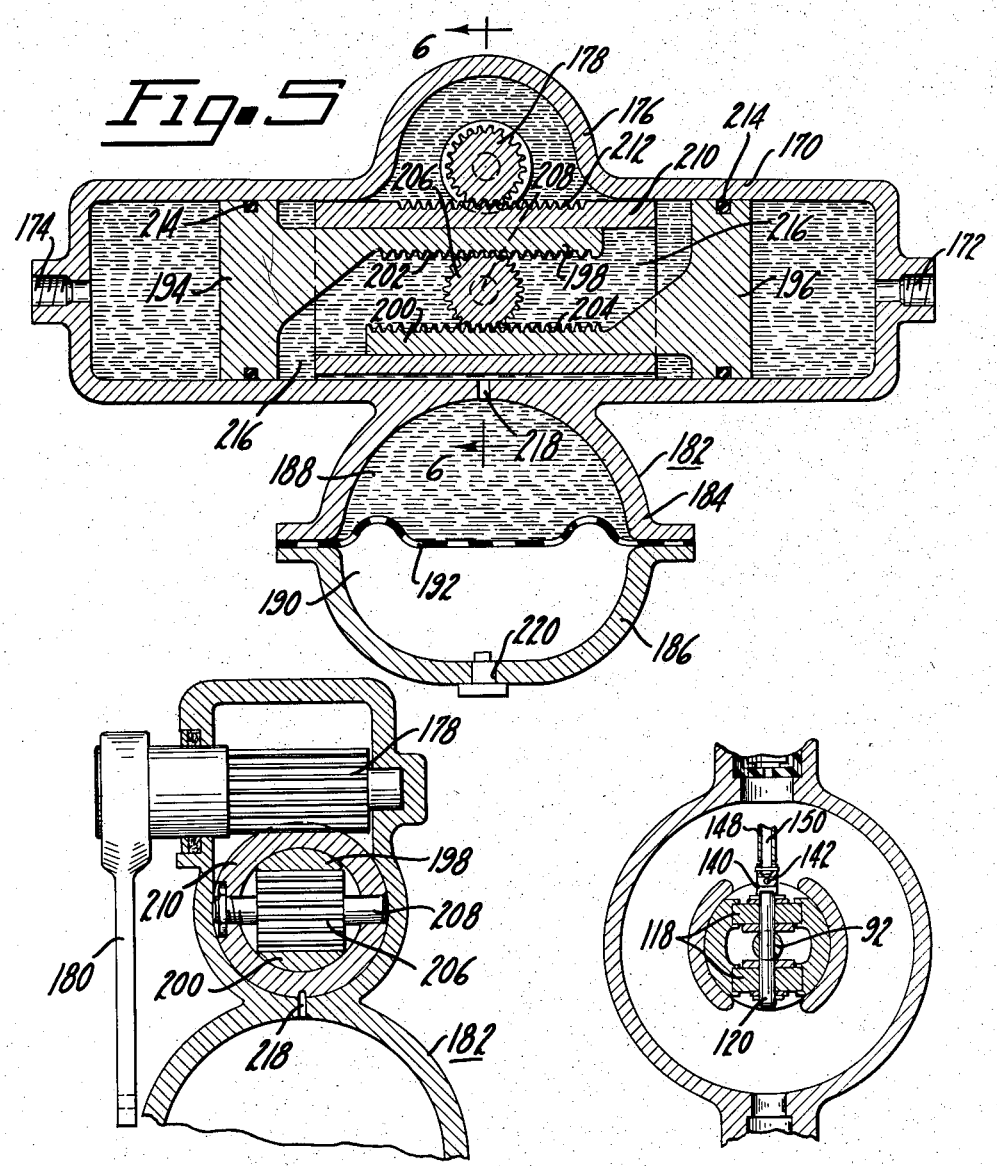

Patented Aug. 29, 1950

2,520,731

UNITED STATES PATENT OFFICE 2,520,731

TEMPERATURE COMPENSATED FORCE AND MOTION TRANSMITTING HYDRAULIC SYSTEM

Stanley I. MacDuff, South Bend, Ind., assignor to Bendix Aviation Corporation, South Bend, Ind., a corporation of Delaware Application October 13, 1944, Serial No. 558,586

9 Claims. (Cl. 60—54.5)

This invention relates to control means for hydraulic systems of the closed circuit type and more particularly to a mechanism which will insure identical operation of both transmitter and receiver of such a system.

Closed systems of this type are commonly used in aircraft where it is desirable to remotely control wing flaps, rudders, ailerons, etc., from a central point within the aircraft. It is obviously important to the pilot of the aircraft that he know, by moving the transmitter lever a predetermined distance that the receiver lever, to which the wing flaps or other apparatus is attached, will move a like distance. It is equally important to the pilot that, once a setting of the apparatus is made for a predetermined flight, the setting will not be disturbed due to extraneous factors such as temperature changes which cause a variation in the volume in the hydraulic fluid. Although the device of the invention is discussed in connection with its use on an aircraft it is understood that it is not limited thereto.

It is, therefore, an important object of this invention to provide a mechanism which will compensate for volume variation of a liquid in a hydraulic system caused by temperature changes.

It is another very important object of the invention to provide a mechanism for a two-pipe line liquid pressure system of the closed circuit type which will automatically compensate for volume variation due to temperature variation of the liquid.

A further object of the invention resides in the provision of a control means having two areas each of which is exposed to liquid pressure of a hydraulic system to compensate for volume variation due to temperature variation of a fluid.

A still further object of the invention resides in the provision of control means including a pair of oppositely disposed pistons subjected to a predetermined common force on one side and system pressures on the other side to compensate for volume variation due to temperature change of a fluid.

Another object of the invention is to provide a means for determining the loss of fluid in a system of the type herein disclosed.

Further objects and advantages of the present invention will be apparent from the following description, reference being had to the accompanying drawings wherein a perfected form of the invention is clearly shown.

In the drawings:

Figure 1 diagrammatically illustrates the invention as applied to a two-pipe line hydraulic system of the closed circuit type. The control mechanism per se of the invention being shown partly in longitudinal sectional view;

Figure 3 is a view taken on the line 3—3 of Figure 2 with portions of the mechanism removed for purposes of clarity;

Figure 5 shows a view in longitudinal section of a modified form of the invention; and Figure 6 is a transverse view partly in section taken on the line 6—6 of Figure 5.

Figure 1:
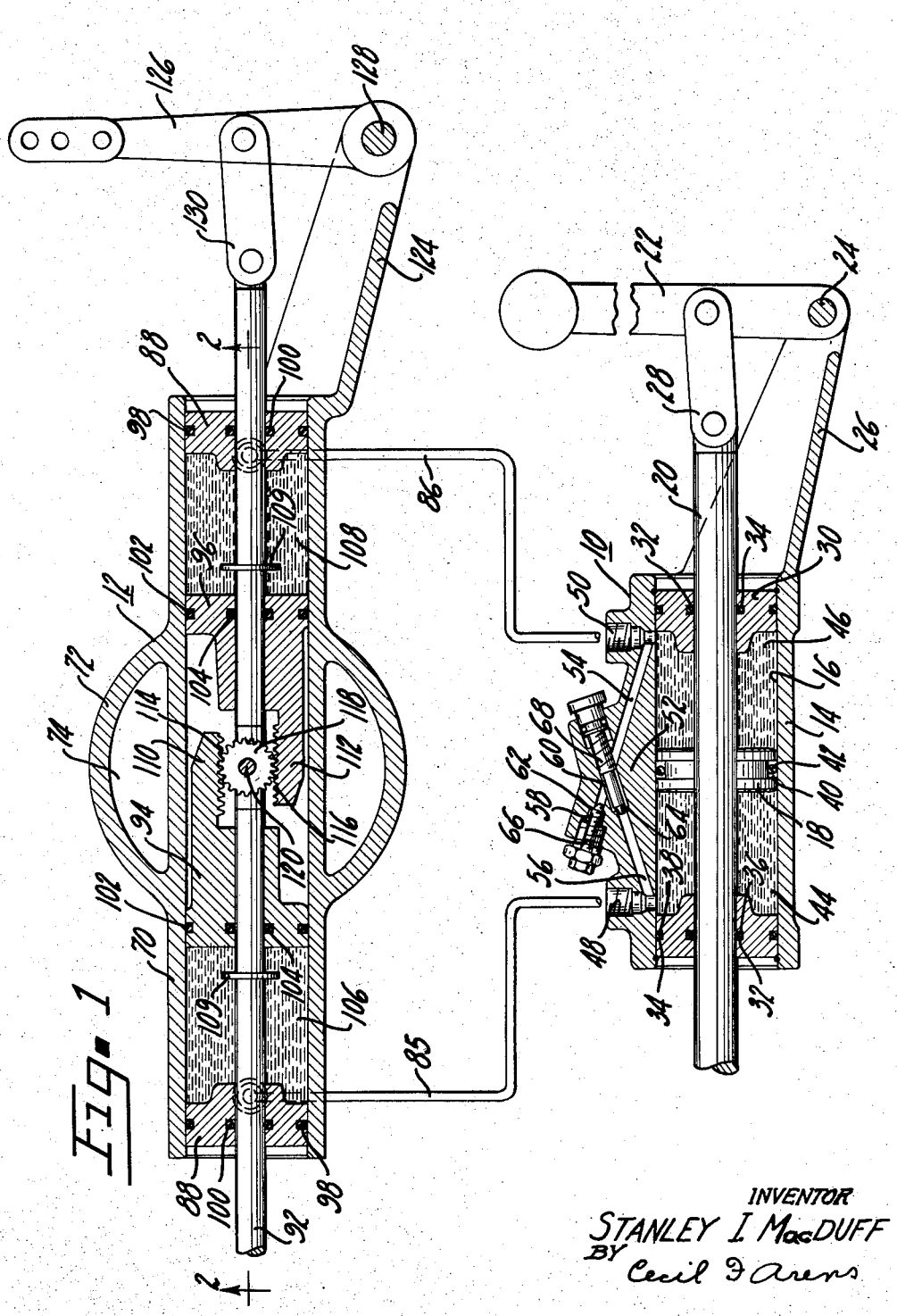

Referring now to Figure 1 which illustrates a closed hydraulic system, the reference numerals 10 and 12 designate fluid motor units which for purposes of exemplification only will be termed the transmitter and receiver units respectively. In the system shown the receiver unit incorporates the control mechanism but as hereinbefore pointed out the receiver unit might as well be the transmitter unit insofar as the function of the two units in the system is concerned. That is, it makes no difference whether the motor unit to which the temperature compensating control mechanism is incorporated is utilized as a transmitter or receiver. The fluid motor unit 10 includes a body or cylinder 14 bored at 16 for the reception of a piston 18 having a shaft 20 connecting a lever or handle 22 fulcrumed at 24 to the bracket 26 which is an integral part of the body. A link 28 connects the shaft 20 to the lever 22 to thereby provide an articulate connection between the shaft and lever. A bearing member 30 recessed at 32 and grooved at 34 for the reception of seals 36 and 38 respectively is disposed in each end of the bore 16 to provide bearing surfaces for the shaft 20. The piston 18 has an annular groove 40 adapted to receive a seal 42 to thereby provide two chambers 44 and 46 within the cylinder 14. The cylinder is drilled and tapped at 48 and 50 to form openings in the ends of the cylinders for connecting the motor unit to the system.

The cylinder 14 has integral therewith an enlarged body portion 52 drilled at 54 and 56 counterbored at 58 and 60. These drilled portions intersect to form a passage connecting opening 48 to opening 50 for by-passing fluid from chamber 44 to chamber 46 and vice versa. The junction of the drilled portions 54 and 56 with the counterbores 58 and 60 respectively form valve seats 62 and 64 which cooperate with valves 66 and 68, whereby the system may be bled to atmosphere by opening the former valve and the fluid transmitted from one side of cylinder 14 to the other side by opening the latter valve.

Figure 2:
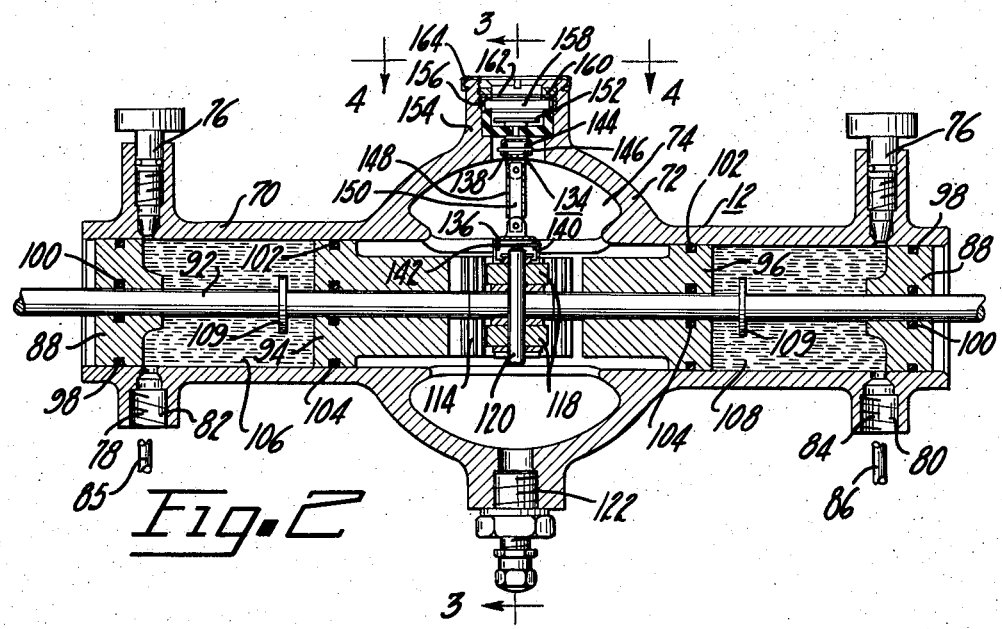
Figure 2 is a view partly in section taken substantially on line 2—2 of the control mechanism shown in Figure 1.
Figure 4:
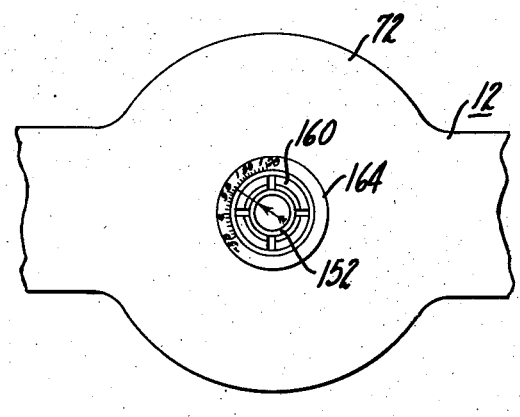
Figure 4 is a plan view of the dial and graduated cap as viewed from line 4—4 of Figure 2.

The fluid motor unit 12 which is adapted to automatically compensate for volume variation due to temperature variation of the fluid in the system comprises a cylinder or body member 70 expanded at 72 to form a chamber 74 for a purpose to be later described. Bleed valves 76 (Figure 2) are located in the ends of the body 70 for communicating the system with atmosphere at times. Openings 78 and 80 formed in the ends of the cylinder are threaded at 82 and 84 respectively to engage connections 85 and 86 which connect the motor unit 10. The cylinder 70 is closed at its ends by members 88 which form bearings for a shaft 92 operatively connected to pistons 94 and 96. These end members are equipped with seals 98 and 100 to provide a system sealed from atmosphere. The pistons 94 and 96 are provided with seals 102 and 104 to thereby seal ends 106 and 108 of the cylinder 70 from the chamber 74.

The pistons 94 and 96 have extensions 110 and 112 with racks 114 and 116 formed therein for engagement with pinions 118 which are rotatably carried by a pin 120 securely fixed to the shaft 92 in any suitable manner. This arrangement of rack and pinion permits a reciprocating action of the pistons with respect to the shaft so that pressure in chamber 74 acting on the pistons will tend to urge the pistons simultaneously apart at the same rate but pressure in the end chambers 106 and 108 of the cylinder acting on the pistons will tend to urge the pistons simultaneously together at the same rate. Also the pressure in chamber 74 tends to make the pistons relatively immovable with respect to each other under normal conditions of operation of transmitter and receiver where the pressure is increased in one of the lines and decreased in the other. The pistons are limited in their relative movement away from each other by washers 109 secured to shaft 92. The chamber 74 is filled with a compressible fluid through opening 122 to a predetermined pressure depending on the maximum load to be applied at the transmitter. This compressible fluid provides an elastic medium which permits forcing the pistons together under predetermined conditions of pressure acting in both the end chambers 106 and 108.

A bracket 124 which is formed as an integral part of cylinder 70 supports a lever or external member 126 which is pivoted at 128 and connected to the shaft 92 by a link 130 which provides an articulate connection between the lever and shaft.

A closed liquid system of the type herein referred to may have an adequate amount of liquid for proper synchronization of the transmitter and receiver under certain temperature conditions of the liquid and an inadequate amount of liquid for synchronizing these members under different temperature conditions. To enable an operator to determine at a glance the sufficiency of the liquid in the system an indicating device 134 is provided. The device comprises a pair of universal joints 136 and 138 the former of which is secured to one of the pinions 118 through a yoke 140 which is fastened to the joint 136 by a pin 142. The universal joint 138 is connected to a yoke 144 through a pin 146. A sleeve 148 is swivelly connected with the joint 138. Member 150 is swivelly connected to the joint 138. The sleeve 148 slidably engages the member 150 to provide a sliding connection between the indicating device and the pinion so that actuation of the device will be assured for various positions of the piston as the pinion reciprocates with shaft 92 to the right or left of center as viewed in Figure 2. An indicator or dial 152 having an arrow thereon is fastened to the yoke 144 for movement therewith in response to rotation of the pinion 118. The expanded portion 72 of cylinder 70 is provided with a boss 154 adapted to receive a sealing element 156 which encompasses the periphery of a transparent disc 158 mounted above the dial for exposing the same to an observer. The disc 158 is retained in the boss by a ring-like nut 160 which compresses a washer 162 against the sealing element 156. A graduated member or cap 164 having its central portion removed for viewing the arrow is secured to the boss in any suitable manner such as shown. The member is shown graduated in degrees Fahrenheit but other units may be used as desired.

When the system is filled with fluid to a premediated volume under predetermined conditions of temperature the arrow is adapted to point to a specific position on the graduated cap. This position of the arrow will designate the volumetric conditions of the fluid under predetermined temperature conditions. Normally the volume of fluid in the system on each side of the pistons 94 and 96 is the same and any temperature variation of the fluid is the same since the lines throughout the system are parallel. Therefore, with equal volumes and equal piston areas, a temperature change of the fluid will cause a like change in volume of the fluid and a consequent change in force acting on the pistons 94 and 96 to thereby cause rotation of the pinion. With no loss of fluid from the system any change in volume of the fluid due to temperature variation will cause the arrow to point to that number on the cap corresponding to the temperature of the oil. That is, the ambient temperature is first read and this is checked against the indicator reading for discrepancies. However, should any fluid leak out of the system the arrow will point to a different number on the cap for any given temperature. This change in position of the arrow for any given temperature instantly reveals a leak in the system. By noting the amount of variation of the arrow from a designated number for a given temperature an observer can determine from a table prepared for that purpose whether the system has enough fluid to properly actuate the receiver in response to movement of the transmitter handle under given temperature conditions.

The modified embodiment of the invention shown in Figure 5 comprises a cylinder 170 having openings 172 and 174 therein for connecting the system. The cylinder 170 is enlarged at 176 to provide a housing for a drive pinion 178 which is connected to an arm or external member 180. A dome-like member 182 having a fixed portion 184 integral with the cylinder and a removable portion 186, forms a pair of chambers 188 and 190 separated by a flexible wall element or diaphragm 192. Pistons 194 and 196 having extensions 198 and 200 with racks 202 and 204 formed therein engage a compensating pinion 206 for rotative movement. The pinion 206 is freely rotatable on a pin 208 which is secured against rotation to a sleeve 210 which is provided with a rack 212 adapted to cooperate with the pinion 178 for rotating the same. The pistons 194 and 196 are equipped with seals 214 to form a chamber 216 which is sealed from system pressure. Chamber 216 is in communication with chamber 188 through a restricted passage 218. Chambers 188 and 216 contain fluid which is put under pressure by the admission of gas to chamber 190 through an opening 220. The pressure of the gas acting on the flexible member 192 is transmitted to the fluid of chambers 188 and 216. The restricted port 218 tends to minimize the effect of shock waves created by an attempt to suddenly move pistons 194 and 196. That is, any attempt to suddenly move the pistons against the incompressible fluid will be retarded by fluid friction in the restriction 218.

To prepare the system for use the chamber 74 is put under a gas pressure which is determined by the maximum load to be applied to the transmitter and in all cases the pressure in this chamber must be at least half of the applied transmitter pressure. Obviously, if the pressure in chamber 74 were anything less than one-half the applied maximum transmitter pressure the pistons 94 and 96 would collapse or be forced toward each other when maximum load was applied to the transmitter.

When the chamber 74 is put under the desired pressure which is determined by the maximum load to be applied to the transmitter and the system filled with a fluid such as oil until the pistons are substantially in the position shown to allow for expansion and contraction of the fluid due to temperature change, the levers 22 and 126 are then adjusted to occupy the same relative positions. This adjustment is accomplished by raising the centralizing valve 68 from seat 64 to establish communication between chambers 44 and 46 through the passages 54 and 56 which connect the two sides of the system. Opening of the valve 68 to allow free communication between the chambers 44 and 46 permits movement of piston 18 of the motor unit without transmitting a like movement to the pistons 94 and 96 since the oil in the two chambers of the motor unit 10 is free to pass from one end of the motor unit to the other end. After the adjustment has been completed the valve 68 is closed. It is to be noted that the pressure in the system under static conditions, that is, with no force applied to the transmitter, is the same as the pressure in chamber 74 since the pressure in this chamber is acting equally on the pistons 94 and 96 urging them against the fluid of the system. Bleed valves 66 and 76 are located in strategic positions in the system for purging the system of air.

The operation of the automatic control mechanism which is responsive to change in volume due to temperature variation is as follows:

With the pistons of the motor unit 10 and 12 in the positions shown in Figure 1, assume a rise in temperature of the fluid in the system. This temperature rise caused by a change in ambient will be the same in both of the lines 84 and 86 since these lines as aforementioned parallel each other. This temperature rise also will increase the volume of fluid in the system. The increase in volume of fluid is compensated for by the collapse of pistons 94 and 96 which move toward each other against the pressure in chamber 74. The movement of the pistons caused by equal opposed pressures acting in chambers 106 and 108 due to volumetric expansion rotates the pinions 118 which engage racks 114 and 116 without disturbing the position of shaft 92 and lever 126 which is connected thereto.

However, any force applied to lever 22, not to exceed a predetermined value, to cause movement of the lever to the left for example, will increase the pressure in line 85 and chamber 106 and equally decrease the pressure in line 86 and chamber 108 to thereby move the pistons 94 and 96 to the right with a consequent movement of lever 126 an amount equal to the angular displacement of lever 22. Under these conditions of differential pressure it is to be noted that the pressure in chamber 74 acts on the opposite sides of the pistons to the system pressure in a manner to prevent rotation of the pinions 118 on pin 120. Stated another way, the increased liquid pressure in chamber 106 will be greater than the pressure of the elastic medium in chamber 74 to create a resultant force to the right and the reduced pressure in chamber 108 is less than the pressure of the elastic medium 74 to create a resultant force to the right. At this time the pistons 94 and 96 function as a single piston rigidly and immovably fixed to shaft 92. The forces acting on pinions 118 are balanced, that is, the moment of force tending to rotate the pinions clockwise, which moment of force is the differential pressure in chambers 74 and 106 acting on piston 94, is equal to the moment of force tending to rotate the pinions counterclockwise which moment of force is the differential pressure in chambers 74 and 108 acting on piston 96. These balanced forces acting on the pinion are resolved into a single component of force which is transmitted through the racks and pinions to the shaft 92 which is accordingly moved. That is, the differential pressure in chambers 106 and 108 move the pistons which at this time are relatively immovable with respect to each other and to the shaft.

In the modified form, Figure 5, the piston shaft has been eliminated and in its stead the sleeve 210 has been substituted which is connected to the lever 180 which is driven through the pinion 178, rack 212, sleeve 210, pin 208, pinion 206 and racks 202 and 204. Should there be a change in fluid volume in the system due to temperature variations the pistons will move toward or away from each other to thereby rotate compensating pinion 206 without affecting movement of the lever 189.

I claim:

1. In a closed hydraulic system having a force transmitter unit and a receiver unit, one of said units having a central chamber, fluid under pressure in the central chamber, a pair of pistons relatively movable and arranged end to end in said chamber so that the adjacent ends only of said pistons are subjected to the fluid pressure in said chamber to thereby tend to move the pistons in opposite directions, end chambers containing fluid under pressure located at the remote end of said pistons to oppose the aforesaid movement of said pistons, connections between said end chambers and said other unit, a rack on the adjacent end of each of the pistons, and a pinion disposed in a manner to engage the racks and constructed and arranged so that when the pistons are subjected to a pressure differential acting on said remote ends thereof the pistons are held relatively immovable with respect to each other although movable as a single piston within said one unit, and when said remote ends of the pistons are subjected to pressure changes due to variations in temperature of the fluid in said end chambers the pistons are moved relatively to each other.

2. In a closed hydraulic system having a force transmitter unit and a receiver unit interconnected, means associated with the force transmitter unit for applying a force thereto which will be transmitted to the receiver unit, a member associated with the receiver unit to be moved in response to the force applied to the transmitter unit, one of said units comprising a cylinder, a pair of pistons coaxially arranged in the cylinder and relatively movable, a chamber associated with the cylinder, fluid under pressure in the chamber, said fluid acting on one face of each of the pistons tending to separate them, fluid in the other unit and in the ends of the cylinder for acting on the other face of each of the pistons tending to oppose separation thereof, a rack on each of the pistons, and means for drivably interconnecting said pistons, said last-named means including a pinion in driving engagement with the racks and constructed and arranged so that when a force applied to said other unit is transmitted to one or the other of said other face of the pistons the pistons will move together as one piston to cause movement of the member, and when the pressure change in said system due to temperature variation of the fluid is transmitted to said other face of each of the pistons simultaneously the pistons will move relatively to each other, whereby the position of the member remains unaffected.

3. In a closed hydraulic system having a force transmitter unit and a receiver unit interconnected, means associated with the force transmitter unit for applying a force thereto which will be transmitted to the receiver unit, a member associated with the receiver unit to be moved in response to the force applied to the transmitter unit, a pair of pistons coaxially disposed end to end in one of the units and constructed and arranged for relative movement, a pressure chamber formed in said one unit at the adjacent ends of the pistons to subject said ends to pressure tending to urge them apart, fluid under pressure in the other unit and acting on the remote ends of said pistons tending to prevent them from being urged apart, a rack on said adjacent ends of the pistons, a shaft operatively connected to said member, said pistons slidably mounted on the shaft, and a pinion rotatably carried by the shaft and positioned for engagement with the rack so that when the pistons are subjected to a pressure differential acting on the remote ends thereof the pistons are held immovable with respect to each other although movable as a single piston to move said member, and when the remote ends of the pistons are subjected to pressure changes due to variations in temperature of the fluid acting on said remote ends the pistons are moved relatively to each other to prevent movement of said member.

4. In a closed hydraulic system having a force transmitter unit and a receiver unit interconnected, means associated with the force transmitter unit for applying a force thereto which will be transmitted to the receiver unit, a member associated with the receiver unit to be moved in response to the force applied to the transmitter unit, a pair of pistons coaxially disposed end to end in one of the units and having relative movement, a pressure chamber formed in said one unit at the adjacent ends of the pistons to subject said ends to pressure tending to urge them apart, fluid under pressure in the other unit and acting on the remote ends of said pistons tending to prevent them from being urged apart, a sleeve slidably disposed in said one unit and formed with a rack exteriorly thereof, a pinion rotatably carried by said sleeve and positioned interiorly thereof, a rack integral with said adjacent ends of the pistons and constructed and arranged to mesh with said pinion, and a second pinion in mesh with the rack on said sleeve and drivably connected to said member, the arrangement of said first mentioned pinion and said pistons being such that when the pistons are subjected to a differential pressure acting on the remote ends thereof the pistons are held immovable with respect to each other although movable as a single piston to slide said sleeve to cause said member to be moved, and when the remote ends of the pistons are subjected to pressure changes due to variations in temperature of the fluid acting on said remote ends the pistons are moved relatively to each other to prevent movement of said member.

5. In combination with a temperature compensating mechanism for use in a closed hydraulic system in which it is desirable to maintain a predetermined volume of liquid in the system, a motor unit having a pair of relatively movable pistons therein, means including a pinion drivably interposed between the pistons so as to cause them to move toward each other at times and away from each other at other times, a pressure chamber, pressure in the chamber acting on said pistons in a manner tending to move them away from each other and at the same time put the liquid of the system under pressure, a transparent cover for said chamber, a graduated member mounted adjacent the chamber, and an indicator in the chamber viewable through the transparent cover and rotatably connected to the pinion, said indicator being set to point to a predetermined graduation under known conditions of liquid temperature and volume, whereby a change in the volume of liquid in the system at a designated temperature will cause the pinion to rotate the indicator to a position on the graduated member indicating the change.

6. In a closed hydraulic system having a force transmitter unit and a receiver unit interconnected, means associated with the force transmitter unit for applying a force thereto which will be transmitted to the receiver unit, a member associated with the receiver unit to be moved in response to the force applied to the transmitter unit, a pair of pistons coaxially disposed end to end in the receiver unit and constituted for relative movement, a pressure chamber formed in said receiver unit at the adjacent ends of the pistons to subject said ends to pressure tending to urge them apart, fluid under pressure in said transmitter unit and acting on the remote ends of said pistons tending to prevent them from being urged apart, a sleeve slidably disposed in said receiver unit and formed with a rack exteriorly thereof, a pinion rotatably carried by said sleeve and positioned interiorly thereof, a rack integral with said adjacent ends of the pistons and constructed and arranged to mesh with said pinion, a second pinion in mesh with the rack on said sleeve and drivably connected to said member, the arrangement of said first mentioned pinion and said pistons being such that when the pistons are subjected to a differential pressure acting on the remote ends thereof the pistons are held immovable with respect to each other although movable as a single piston to slide said sleeve to cause said member to be moved, and when the remote ends of the pistons are subjected to pressure changes due to variations in temperature of the fluid acting on said remote ends the pistons are moved relatively to each other to prevent movement of said member, and means associated with said pressure chamber for controlling the rate of relative movement between the pistons when the movement is caused by sudden loads transmitted to said pistons from said transmitter unit.

7. In a closed hydraulic system having a transmitting device and a receiving device, a pair of conduits, one conduit connecting one end of the transmitting device to one end of the receiving device and the other conduit connecting the other end of the transmitter device to the other end of the receiver device, a pair of pistons in one of said devices, said pistons being coaxially arranged end to end, said one device including a chamber therein formed at the adjacent ends of said pistons, fluid under pressure in said chamber and acting on the adjacent ends of the pistons tending to urge them apart, fluid in said conduits and in the ends of the devices and acting on the remote ends of said pistons tending to prevent them being urged apart by the fluid under pressure in said chamber, a rack on the adjacent ends of the pistons, a shaft on which the pistons are slidably arranged, a member connected to the shaft for movement, and a pinion engaging the racks and rotatably fixed to the shaft, said pinion being arranged so that when the pistons are subjected to a pressure differential acting on the remote ends thereof the pistons are held immovable with respect to each other although movable as a single piston within said one device to permit movement of said member, and when the remote ends of the pistons are subjected to pressure changes due to variations in temperature of the fluid in said conduits the pistons are moved relatively to each other to compensate for change in volume of the fluid in the conduits.

8. A force transmitter or receiver unit comprising a cylinder, pistons co-axially arranged in the cylinder, means located externally of the cylinder for applying force and motion to the pistons, and a mechanism connecting the pistons to said means in a manner such that the pistons may move together with said means as a unit or equal distances in opposite directions relative to said means.

9. A force transmitter or receiver unit comprising a cylinder, pistons co-axially arranged in the cylinder, means for applying force and motion to the pistons from the exterior of the cylinder, and a mechanism connecting the pistons to said means, said mechanism including a member pivotally carried by said means and connected to adjacent ends of said pistons so that the pistons may move together with said means as a unit or in equally opposite directions relative to said means.

STANLEY I. MacDUFF.

REFERENCES CITED

The following references are of record in the file of this patent:

UNITED STATES PATENTS

| Number | Name | Date |
|---|---|---|
| 1,881,266 | DeGiers | Oct. 4, 1932 |
| 2,286,661 | Warner | June 16, 1942 |
| 2,334,383 | Carr | Nov. 16, 1943 |
| 2,422,139 | Sheridan | June 10, 1947 |

FOREIGN PATENTS

| Number | Country | Date |
|---|---|---|
| 519,099 | Great Britain | Mar. 15, 1940 |
| 543,340 | Great Britain | Feb. 20, 1942 |
| 752,390 | France | July 17, 1933 |
| 803,441 | France | July 6, 1936 |